(12) United States Patent
Belge et al.

(10) Patent No.: US 6,829,330 B2
(45) Date of Patent: Dec. 7, 2004

(54) SYSTEMS AND METHODS FOR LOOP CHARACTERIZATION FROM DOUBLE - ENDED MEASUREMENTS

(75) Inventors: Murat Belge, Billerica, MA (US); Rainer Storn, Kirchheim (DE)

(73) Assignee: Aware, Inc., Bedford, MA (US)

( * ) Notice: Subject to any disclaimer, the term of this patent is extended or adjusted under 35 U.S.C. 154(b) by 230 days.

(21) Appl. No.: 10/127,488

(22) Filed: Apr. 23, 2002

(65) Prior Publication Data

US 2002/0181665 A1 Dec. 5, 2002

Related U.S. Application Data

(60) Provisional application No. 60/286,371, filed on Apr. 26, 2001.

(51) Int. Cl.[7] .......................... H04M 1/24; H04M 3/08; H04M 3/22
(52) U.S. Cl. .................. 379/22.04; 379/1.01; 379/1.04; 379/22; 379/24; 379/27.03; 379/28
(58) Field of Search ............................. 379/1.01, 1.03, 379/1.04, 22, 22.01, 22.02, 22.03, 22.04, 24, 27.01, 27.02, 27.03, 27.08, 28, 29.01, 29.03, 29.04, 30; 324/500, 519, 520, 522, 525, 527, 532, 533, 534

(56) References Cited

U.S. PATENT DOCUMENTS

| | | | |
|---|---|---|---|
| 5,128,619 A | | 7/1992 | Bjork et al. |
| 5,864,602 A | | 1/1999 | Needle |
| 6,002,671 A | * | 12/1999 | Kahkoska et al. .......... 370/248 |
| 6,058,162 A | * | 5/2000 | Nelson et al. ............ 379/22.04 |
| 6,091,713 A | * | 7/2000 | Lechleider et al. ......... 370/248 |
| 6,177,801 B1 | * | 1/2001 | Chong ........................ 324/520 |
| 6,205,202 B1 | * | 3/2001 | Yoshida et al. .......... 379/27.02 |
| 6,215,855 B1 | * | 4/2001 | Schneider ...................... 379/22 |
| 6,292,468 B1 | * | 9/2001 | Sanderson .................. 370/241 |
| 6,292,539 B1 | * | 9/2001 | Eichen et al. ............... 379/1.04 |
| 6,487,276 B1 | * | 11/2002 | Rosen et al. ................ 379/1.04 |
| 6,516,049 B1 | * | 2/2003 | Heidari et al. ............. 379/1.01 |
| 6,538,451 B1 | * | 3/2003 | Galli et al. .................. 324/533 |
| 6,553,098 B1 | * | 4/2003 | Harrison et al. ......... 379/22.03 |
| 6,584,176 B2 | * | 6/2003 | Murphree et al. ............ 379/24 |
| 2001/0043647 A1 | * | 11/2001 | Belge .......................... 375/222 |

FOREIGN PATENT DOCUMENTS

| | | |
|---|---|---|
| EP | 1041731 | 10/2000 |
| GB | 2 303 032 A | 2/1997 |
| WO | WO 97/01900 A1 | 1/1997 |
| WO | WO 99/26375 A2 | 5/1999 |
| WO | WO 00/64130 | 10/2000 |
| WO | WO 0101158 | 1/2001 |
| WO | WO 0152439 | 7/2001 |
| WO | WO 0213405 | 2/2002 |

OTHER PUBLICATIONS

Lewis L. et al.: "*Extending Trouble Ticket Systems To Fault Diagnostics*" IEEE Network, Nov. 1993, pp. 44–51, XP 000575228.

Patrick Boets et al.: "*The Modelling Aspect Of Transmission Line Networks*" Proceedings Of The Instrumentation And Measurement Technology Conference, US, New York, IEEE, May 12, 1992, pp. 137–141, XP 000343913.

Marcos Tzannes "*Draft New Recommendation G.996.1: Test Procedures For Digital Subscriber Line (DSL) Transceivers—For Approval*", Mar. 1992, 2 pages.

Ranier Storn et al. "*Differential Evolution—A Simple And Efficient Adaptive Scheme For Global Optimization Over Continuous Spaces*", Mar. 1995, 11 pages.

International Search Report, Date of Mailing Mar. 14, 2003.

Rizzi, P. A., "Microwave Engineering", Prentice–Hall, Englewood Cliffs, N.J., 1988, pp. 534–540.

* cited by examiner

Primary Examiner—Quoc Tran
(74) Attorney, Agent, or Firm—Miles & Stockbridge P.C.

(57) ABSTRACT

The loop length, the number of bridge taps and the length of the bridged taps can be estimated by comparing through the use of differential evolution a measured frequency domain channel impulse response of the transmission line to a model of a transmission line that is composed of multiple sections and multiple bridge taps. The diagnostic and test information describing the condition of the line can then be exchanged, for example, by two transceivers during a diagnostic link mode, or the like.

20 Claims, 4 Drawing Sheets

US 6,829,330 B2

SYSTEMS AND METHODS FOR LOOP CHARACTERIZATION FROM DOUBLE-ENDED MEASUREMENTS

RELATED APPLICATION DATA

This application claims the benefit of and priority under 35 U.S.C. §119(e) to U.S. Patent Application Ser. No. 60/286,371, filed Apr. 26, 2001, entitled "Loop Characterization: Estimation Of The Loop Length And The Bridged Tap Lengths Of A Subscriber Loop With A Model Based Least-Squares Approach Using Differential Evolution Algorithm," and is related to U.S. patent application Ser. No. 09/755,172, filed Jan. 8, 2001, entitled "Systems and Methods for Loop Length And Bridged Tap Length Determination of a Transmission Line," both of which are incorporated herein by reference in their entirety.

BACKGROUND OF THE INVENTION

1. Field of the Invention

This invention relates to determination of transmission line characteristics. In particular, this invention relates to systems and methods for loop characterization from double-ended measurements by estimating the loop length and the bridged tap lengths of a subscriber loop with a model based least-squares approach using a differential evolution algorithm.

2. Description of Related Art

The collection and exchange of diagnostic and test information between transceivers in a telecommunications environment is an important part of a telecommunications, such as an ADSL, deployment. In cases where the transceiver connection is not performing as expected, for example, where the data rate is low, where there are many bit errors, or the like, it is necessary to collect diagnostic and test information from the remote transceiver. This is performed by dispatching a technician to the remote site, e.g., a truck roll, which is time consuming and expensive.

In DSL technology, communications over a local subscriber loop between a central office and a subscriber premises is accomplished by modulating the data to be transmitted onto a multiplicity of discrete frequency carriers which are summed together and then transmitted over the subscriber loop. Individually, the carriers form discrete, non-overlapping communication subchannels of limited bandwidth. Collectively, the carriers form what is effectively a broadband communications channel. At the receiver end, the carriers are demodulated and the data recovered.

DSL systems experience disturbances from other data services on adjacent phone lines, such as, for example, ADSL, HDSL, ISDN, T1, or the like. These disturbances may commence after the subject ADSL service is already initiated and, since DSL for internet access is envisioned as an always-on service, the effect of these disturbances must be ameliorated by the subject ADSL transceiver.

SUMMARY OF THE INVENTION

Identifying, measuring and characterizing the condition of a transmission line is a key element of an ADSL deployment. In cases when the transceiver connection is not performing as expected, for example, the data rate is low, there are many bit errors, a data link is not possible, or the like, it is important to be able to identify the loop length and the existence, location and length of any bridged taps without having to send a technician to the remote modem site to run diagnostic tests.

This invention describes an exemplary system and method for estimating the loop length, the number of bridged taps and length of the bridged taps on a transmission line. The loop length, the number of bridge taps and the length of the bridged taps can be estimated by comparing a measured frequency domain channel impulse response of the transmission line to a model of a transmission line that is composed of multiple sections and multiple bridge taps. The diagnostic and test information describing the condition of the line can then be exchanged, for example, by two transceivers during a diagnostic link mode, or the like.

These and other features and advantages of this invention are described in or are apparent from the following detailed description of the embodiments.

BRIEF DESCRIPTION OF THE DRAWINGS

The embodiments of the invention will be described in detail, with reference to the following figures wherein.

DETAILED DESCRIPTION OF THE INVENTION

The exemplary embodiments of this invention will be described in relation to the application of the invention to an ADSL transceiver environment. However, it should be appreciated that in general the systems and methods of this invention will work equally well for any multiple section loop with one or more bridged taps.

The exemplary systems and methods of this invention will be described in relations to a subscriber line, such as a digital subscriber line. However, to avoid unnecessarily obscuring the present invention, the following description omits well-known structures and devices that may be shown in block diagram form or otherwise summarized. For the purposes of explanation, numerous specific details are set forth in order to provide a through understanding of the present invention. It should be appreciated however that the present invention may be practiced in a variety of ways beyond these specific details. For example, the systems and methods of this invention can generally be applied to any type of transmission line.

Furthermore, while the exemplary embodiments illustrated herein show the various components of the loop estimation system collocated, it is to be appreciated that various components of the system can be located at distant portions of a distributed network, such as a telecommunications network and/or the Internet, or within a dedicated loop estimation system. Thus, it should be appreciated that the components of the loop estimation system can be combined into one or more devices or collocated on a particular node of a distributed network, such as a telecommunications network. As will be appreciated from the following description, and for reasons computational efficiency, the components of the loop estimation system can be arranged at any location within a distributed network without affecting the operation of the system. For example, the various need not be collocated with the CO modem as shown, but could alternatively be collocated with the CPE modem, or some combination thereof.

Furthermore, it should be appreciated that the various links connecting the elements can be wired or wireless links, or a combination thereof, or any other known or later developed element(s) that is capable of supplying and/or communicating data to and from the connected elements. Additionally, the term module as used herein can refer to any known or later developed hardware, software, or combination of hardware and software that is capable of performing the functionality associated with that element.

Figure 1:
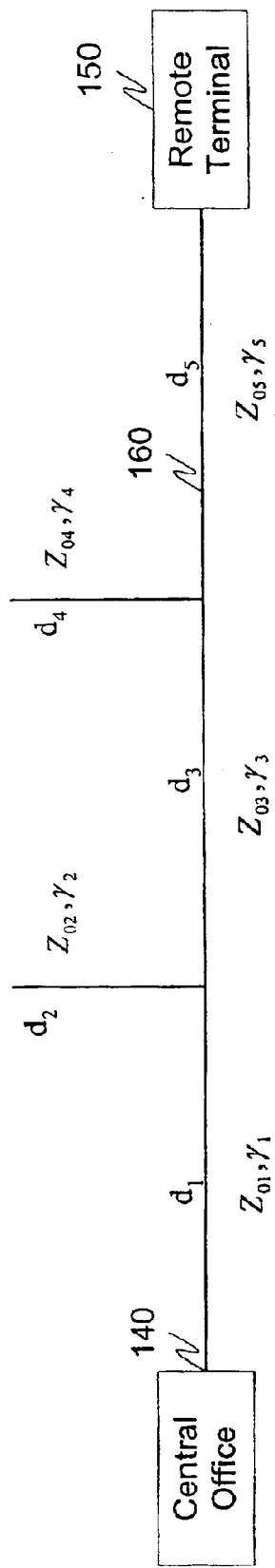
FIG. 1 is a functional block diagram illustrating a typical subscriber loop connecting the customer home (CPE) to the central office (CO) according to this invention.

The exemplary systems and methods of this invention describe the physical characterization of transmission lines which comprise a concatenation of several twisted-pair copper wires. The physical characterization is the length of the individual wire sections and their overall configuration and their relation to one another. A double-ended measurement scheme, i.e., the signal transmitter and the receiver reside in the opposite ends of the transmission line, is used to extract the relevant data FIG. 1 illustrates a typical subscriber loop 160 comprising a central office modem 140 and a CPE modem 150. In this figure, the subscriber line 160 is made up of three concatenated sections, of length d, of differing gauges and two bridged taps, open-circuited twisted pairs which are connected in shunt with the working twisted pair. The physical parameters of each wire; the length, the characteristic impedance $Z_0$ and the propagation constant γ, are indicated in the figure. In general the characteristic impedance and the propagation constant per unit length of the wire are frequency dependent complex quantities which are functions of the thickness and the insulation of the wire. These quantities govern how an electrical signal propagates through the wire. For example, the real part of the γ(f) determines the attenuation experienced by a sinusoid, which oscillates at the same frequency f, launched into the wire and the complex part of the γ(f) determines the phase shift experienced by same the sinusoid. There are only so many different cables deployed in the field and a gauge number is associated with the most commonly used ones. For example, in U.S. a number is assigned to wire to denote the wire gauge. 19, 22, 24, and 26 gauge wires are the most commonly used twisted-pairs and their $Z_0$ and γ values are known. In Europe, wires are referred to by their thickness, such as 0.4 mm wire, 0.5 mm wire, or the like.

Figure 2:
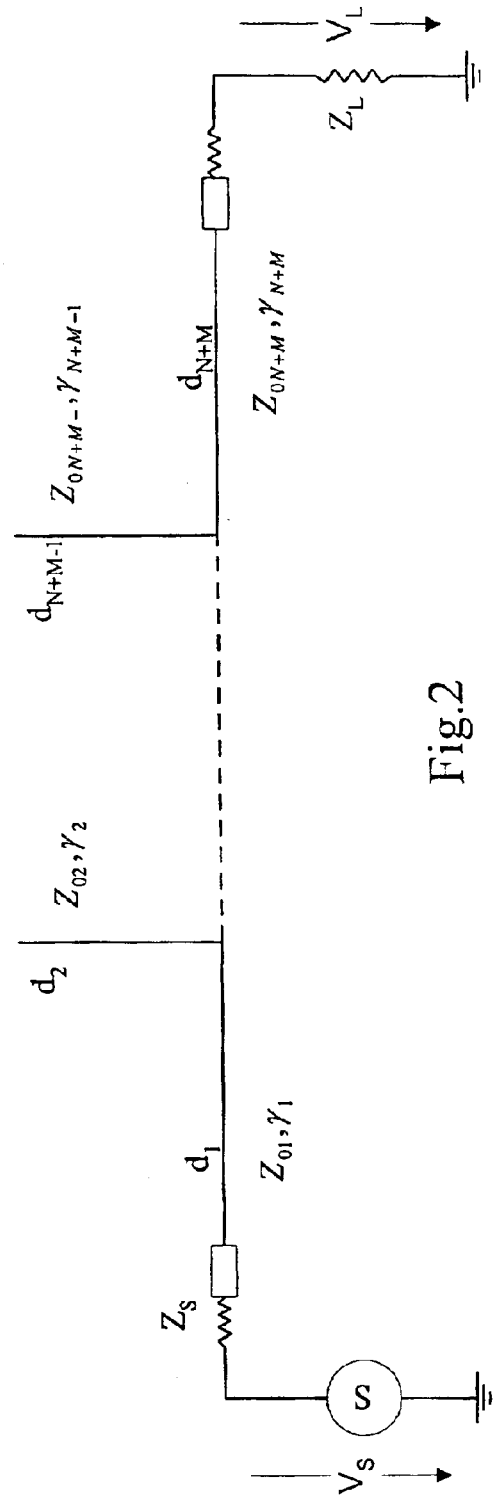
FIG. 2 is an exemplary model of a loop according to this invention.
Figure 3:
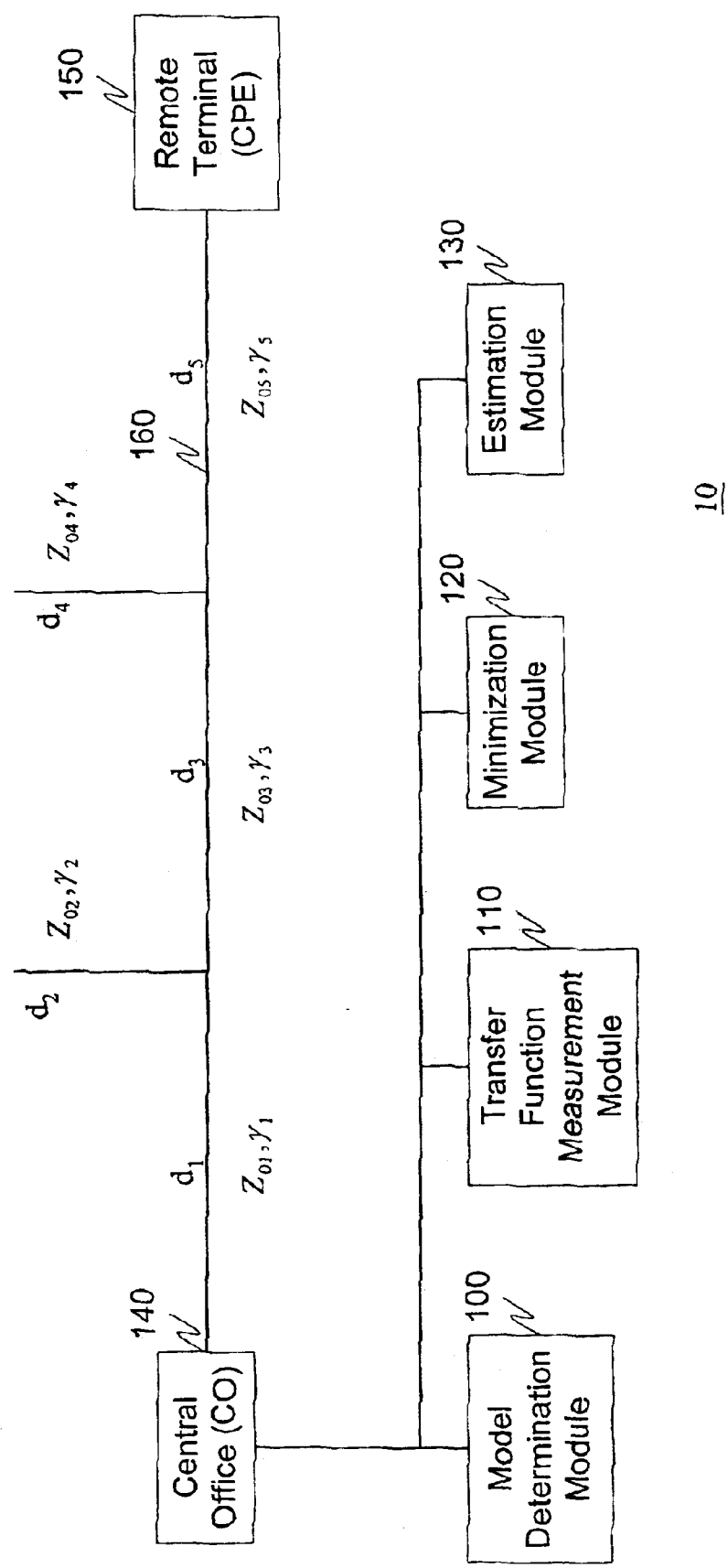
FIG. 3 illustrates an exemplary loop characterization system according to this invention.

Based on the exemplary model of a loop illustrated in FIG. 2, the steps leading to the determination of the physical structure of the loop are 1) to form a model of the transfer function, in the frequency domain, of the subscriber loop in terms of the physical parameters of the sections making up the loop, 2) to measure the actual transfer function of the loop by transmitting a wide-band signal, and 3) to compare the subscriber loop model with actual measurements by varying the model parameters and choosing the model that mos closely approximates the actual measurements as the solution.

The frequency dependent transfer function of the loop is derived based on the model in FIG. 2. In FIG. 2, $Z_s$ and $Z_L$ denote the frequency dependent impedances of the signal source (source) and the measurement device (load) that are being used. In accordance with an exemplary embodiment of this invention, the source and load are a pair of ADSL modems which are located in the central office (CO) and the customer premises (CPE). The theoretical model for the channel transfer function for this case can be described in two steps. The first step comprises writing the equations for the current and voltage at the source, $I_S$ and $V_S$, in terms of current and voltage at the load, $I_L$ and $V_L$, through the application of ABCD matrices:

$$\begin{bmatrix} V_S(f) \\ I_S(f) \end{bmatrix} = \begin{bmatrix} 1 & Z_S(f) \\ 0 & 1 \end{bmatrix} \prod_{i=1}^{M+N} A_i(f) \begin{bmatrix} 1 & Z_L^{-1}(f) \\ 0 & 1 \end{bmatrix} \begin{bmatrix} V_L(f) \\ I_L(f) \end{bmatrix}$$

where $A_i$ is an ABCD matrix, a 2 by 2 matrix describing the current-voltage relation at the input and output of a two port network, of the ith section of the loop and f a dummy variable indicating the frequency dependent nature of the related quantities. See P. A. Rizzi, "Microwave Engineering" Prentice-Hall 1988, which is incorporated herein by reference in its entirety. The ABCD matrix of the first working section of the subscriber loop in FIG. 2, for example, is given by:

$$A_1(f) = \begin{bmatrix} \cosh(\gamma_1(f) \times d_1) & Z_{01}(f) \times \sinh(\gamma_1(f) \times d_1) \\ Z_{01}^{-1}(f) \times \sinh(\gamma_1(f) \times d_1) & \cosh(\gamma_1(f) \times d_1) \end{bmatrix}$$

Note that the elements of $A_1$ are phasor quantities, or complex numbers describing the current-voltage relationship at a single frequency point, f. ABCD matrices of other elementary sections of a transmission loop, for example a bridged tap, can be derived. See J. J. Werner, "HDSL Environment," which is incorporated herein by reference in its entirety, for details.

Assuming that $Z_s$ and $Z_L$ are known, the voltage transfer function of the loop can be obtained from the equation above as:

$$H(x, f) = \frac{V_L(f)}{V_S(f)}$$

where $x = [d_1, g_1 \ldots d_{N+M}, g_{N=M}]$ is the vector of model parameters, with $d_i$ representing the length of the $i^{th}$ section and $g_i$ representing the gauge, and therefore the $Z_0, \gamma$ values, of the $i^{th}$ section, and f is a dummy variable indicating the frequency dependency of the voltage transfer function. M is the number of working sections of the loop and N is the number of bridged taps connected to the working sections of the loop. Here $d_i$ takes on a continuum of values in the interval (0, Maximum section length) and $g_i$ takes discrete values indexing the gauge of the $i^{th}$ section among a number of possible wire gauges. For example, if it is anticipated that the loop consists of four primary types of wire, (19awg, 22awg, 24awg, 26awg), then $0 \leq g_i \leq 3$ with $g_i=0$ indicating the gauge of the $i^{th}$ section is 19awg and $g_i=3$ indicating the gauge of the $i^{th}$ section is 26awg, and so on.

The actual transfer function of the loop can be measured, for example, during modem initialization. An estimate the voltage transfer function of the loop can be determined by averaging K consecutive frames of a periodic signal transmitted from the sources. In order to be able to correctly identify the transfer function of the loop, it is necessary that the transmitted signal excite all frequencies of interest. The simplest form of a signal that satisfies this criteria is a sequence which has equal power at all frequencies within the frequency band of interest. Such a periodic signal will be referred as "reverb." Note that there are other ways of measuring the transfer function of the loop such as transmitting a pseudo-random sequence from the transmitter and extracting the transfer function of the loop by correlating the received signal at the load by the known transmitted signal. Such methods can also be used in the current scheme as in general all that is necessary for step 2) is a measurement of the transfer function of the loop. The particular measurement method does not affect the end result. Mathematically, the transfer function of the loop can be represented by:

$$Rx(f) = \frac{1}{K}\sum_{i=1}^{K} FFT_P(rx_i)$$

where $rx_i$, is the P-point reverb sequence formed by sampling the time-domain received reverb signal. In reality the channel impulse response is available only at a set of discrete frequencies, called tones, which are multiples of a base frequency spacing $\Delta f$. In an ADSL system, for example, $\Delta f = 4312.5$ Hz. Each tone in the frequency domain is given by:

$$f_i = i\Delta f, \ldots i=1, \ldots, P$$

Given the actual transfer function of the loop, $Rx(f_i)$, and the model transfer function $H(x,f_i)$, the model parameters $x=[d_1, g_1 \ldots d_{N+M}, g_{N-M}]$ which minimize the following error criteria are found in accordance with:

$$c(x, f_i) = \begin{cases} \infty, & \text{if } d_i < 0 \text{ or } d_i > \text{Maximum section length for } ith \text{ section} \\ \infty, & g_i < 0 \text{ or } g_i > L \\ \sum_{i=i_f}^{i_l} |\log H(x, f_i) - \log Rx(f_i)|^2, & \text{else} \end{cases} \quad (1)$$

where $i_f$ and $i_l$ are the first and the last tones that are used in the error computations, and L is the number of anticipated wire types/gauges present in the subscriber loop.

As will be explained in the following section, the minimization of the cost function $c(x,f_i)$ is not a trivial task and will be dealt by the "differential evolution" algorithm.

Since the cost function in Eq. 1 is nonlinear in x, the minimization of Eq. 1 requires a method which is capable of performing in the presence of multiple minima to find the global minimum of Eq. 1. The most straightforward approach is the "brute force" method which enumerates all solutions of x and saves the solution x=x_opt for which Eq. 1 becomes the absolute minimum. For the components of x being from the field of real numbers, the "brute force" approach is impractical as an infinite number of potential solutions should be tried. Hence, for real-world applications, the components of x should be discretized. If each component of x can attain $k_i$ values then:

$$P = \prod_{i=1}^{N+M} k_i \quad (2)$$

values have to be searched. However, the number P quickly becomes prohibitive if the computation time to minimize Eq. 1 is to stay within reasonable bounds. Nevertheless, the computation time can be reduced if partial results of Eq. 1 are pre-computed with the trade-off being the large storage requirements.

Chip integrability is a further restriction which rules out most of the alternative optimization approaches like multistart gradient searches, genetic or other stochastic algorithms. While these solutions are possible, most of these algorithms are either too costly to implement or the convergence properties are inferior. For practical implementations it is also often required to have a discretized set of values for the components of x which destroys the differentiability of Eq. 2 and hence renders gradient-based methods inappropriate.

A global optimization algorithm which can handle nonlinear and even non-differentiable cost functions while maintaining excellent convergence properties and simple implementation is Differential Evolution (DE). See R. Storn and K. Price, "Differential Evolution—A Simple and Efficient Heuristic for Global Optimization over Continuous Spaces," Journal of Global Optimization 11, 1997, pgs 341–359.

After, for example, initialization, the DE algorithm iterates through a mutation/selection cycle until some stopping criterion, for example, the maximum number of allowed iterations, being met. In its most general form, DE starts out with a population of NP parameter vectors being described by a (2M+2N)xNP matrix:

$$X=[x_1, x_2, \ldots, x_{NP}] \quad (3)$$

and each vector $x_j$ is associated with a cost value:

$$c_j = c(x_j) \quad (4)$$

where $c(x_j)$ is as given in Eq. 1. During initialization the initial vectors of X are chosen according to some pertinent method, such as a random generation of the parameters from a defined interval, uniform sampling of the parameters within the defined interval, or the like.

In a mutation step, during one iteration each vector of X competes against a trial vector which is determined according to the mutation equation:

$$x_{trial} = x_{r1} + F \cdot (x_{r2} - x_{r3}) \quad (5)$$

For convenience the vector of X which enters the competition is called the target vector, and in general for each target vector a new trial vector is determined. The vectors $x_{r1}, x_{r2}, x_{r3}$ are usually taken from X, i.e., the indices r1, r2 and r3 are from the set $\{1, 2, \ldots, NP\}$ and in general chosen to be mutually different. However, one or more of the vectors $x_{r1}, x_{r2}, x_{r3}$ can also be chosen to be some other vector like the current best vector, the average vector of X, another randomly chosen vector, or the like. The trial vector may also undergo some recombination or crossover operation with yet another vector which means that not all parameters of the trial vector are determined according to Eq. 5 but some are taken from this other vector. The weighting variable F is usually a constant real number from the interval [0,1]. However, F may also be a random number or even a random vector in the case of which the dot in Eq. (5) denotes the dot product. When F is chosen to be a vector, the random selection of its components from the interval [0.75,1] has proven to be beneficial in order to prevent stagnation.

For selection, in its basic form, the cost $c_{trial} = c(x_{trial}, f_i)$ is determined and compared against $c_{target} = c(x_{target}, f_i)$. The vector with the lowest cost enters the population $X_{new}$ where $X_{new}$ may be X itself, i.e., the winner vector immediately replaces the target vector. Another possibility is to utilize a second matrix for $X_{new}$ and leave X intact until all competitions have occurred. For the new iteration X is set to $X_{new}$. Other selection schemes like taking the NP best vectors of X and $X_{new}$ are also possible. Should it occur that a vector has components which are out of bounds, for example loop length being negative or unreasonably large in context of our application, a high cost value is associated with that vector as in Eq. 1 so that it does not have a chance to survive the selection process. Other possibilities like reinitialization of the vector to handle the out of bounds problem are also possible.

Figure 4:
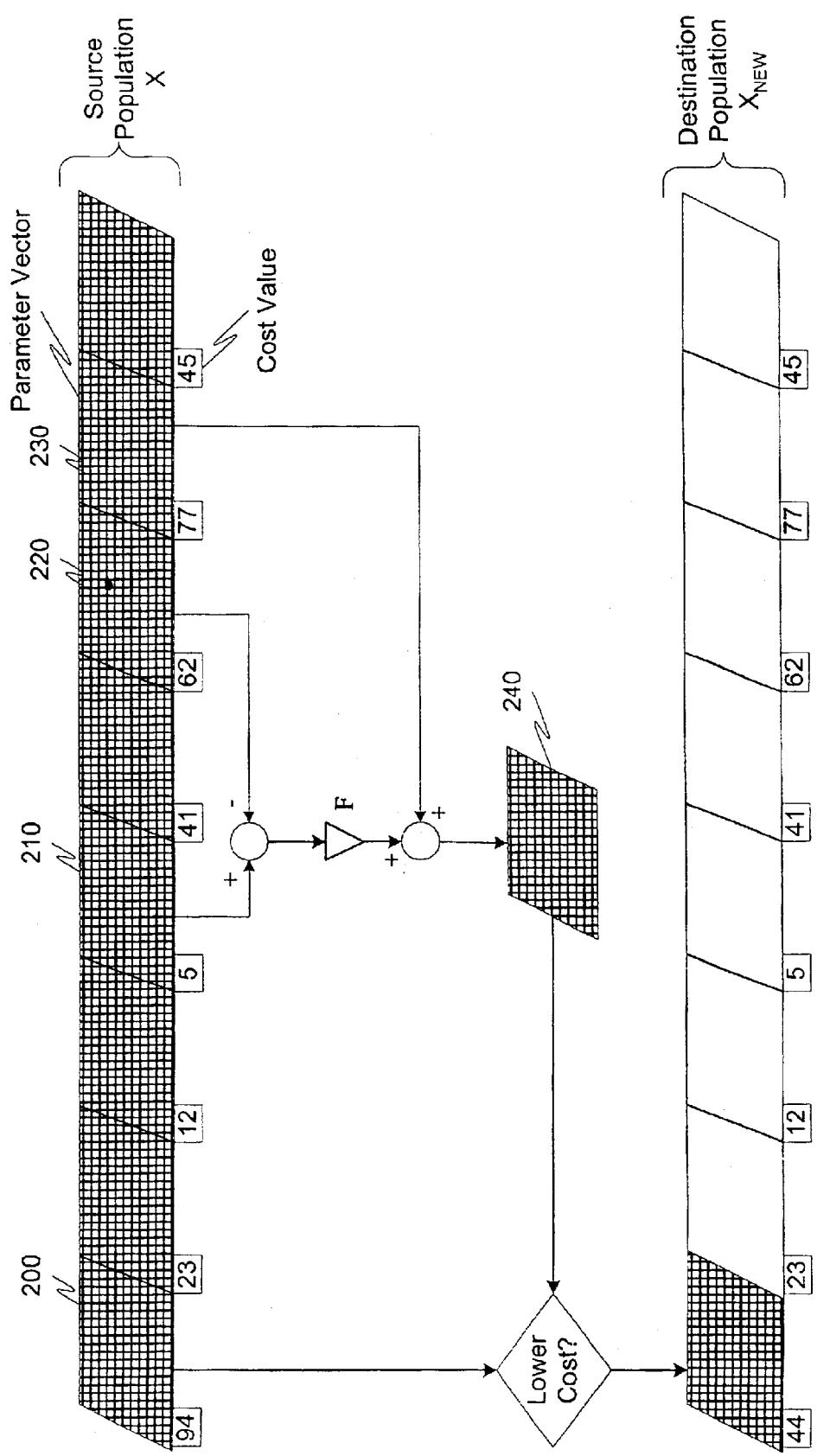
FIG. 4 illustrates an overview of the most common differential variant.
Figure 5:
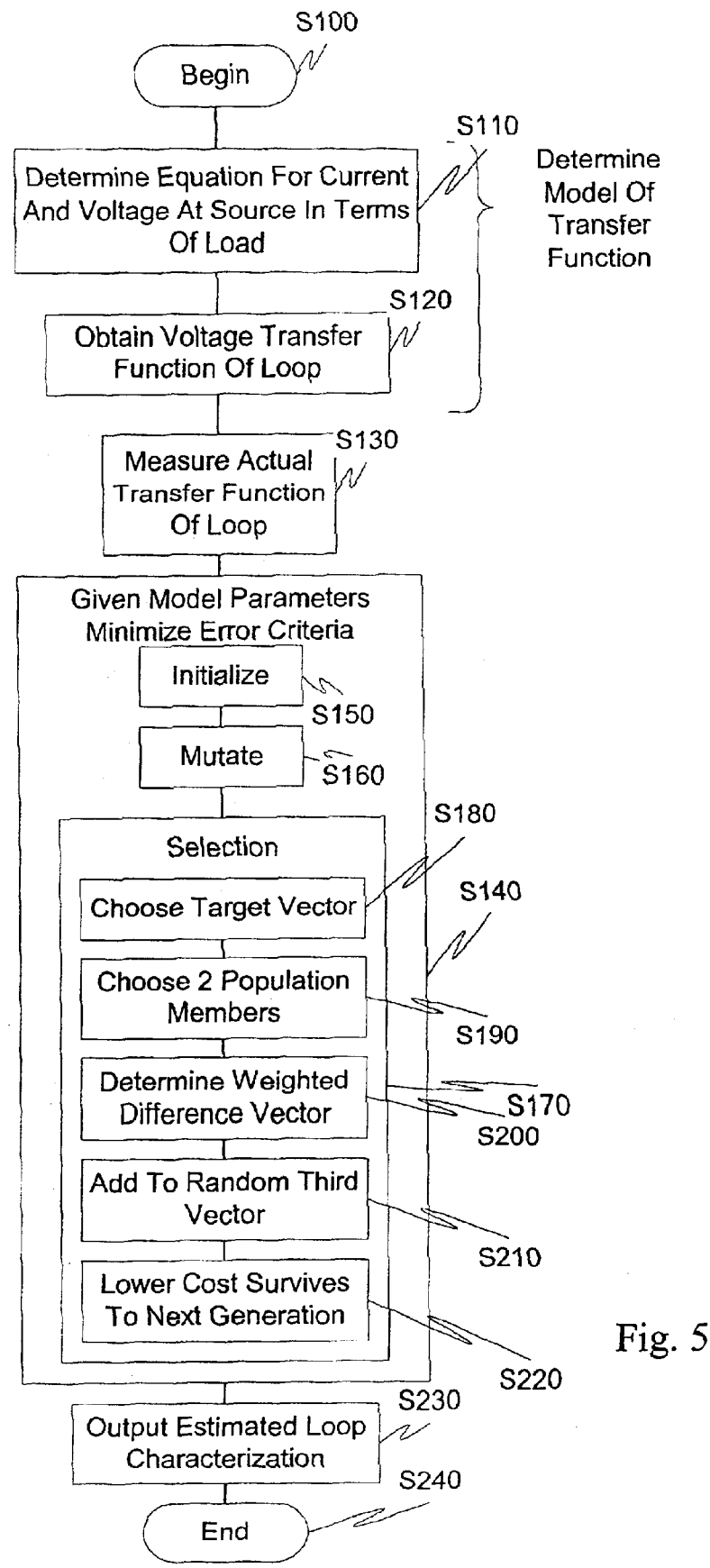
FIG. 5 is a flowchart illustrating an exemplary method for determining loop characteristics according to this invention.

FIG. 4 summarizes the operation of the most common DE variant. Specifically, in FIG. 4, a target vector 200 is chosen. Next, two population members 210 and 220 are randomly chosen from the source population X. Then, the weighted difference vector of the two population members is determined based on weighting variable F.

The weighted difference vector is then added to a randomly chosen third parameter vector 230 to produce a new trial vector 240. This new trial vector 240 is compared to the target vector 200, and th vector with the lower cost forwarded to the destination population $X_{new}$.

FIG. 4 outlines an exemplary loop characterization system 10. In particular, the loop characterization system 10 comprises a model determination module 110, a transfer function measurement module 110, a minimization module 120, an estimation module 130, a central office modem 140 and remote terminal modem 150. The central office modem 140 and the remote terminal modem 150 are interconnected by a transmission line, i.e., loop, 160.

In operation, the model determination module 100 determines a model of the transfer function of the transmission line 160. In particular, the model termination module 100 determines an equation representing the current and voltage at the source ($I_S$, $V_S$) in terms of the current and voltage at the load ($I_L$, $V_L$) through the application of ABCD matrices as discussed above. The model determination module 100 then determines the voltage transfer function of the loop based on the number of working sections of the loop and the number of bridged taps connected to the working sections of the loop and wire gauge values.

In general the number of sections of the loop are not available precisely but a reliable upper bound on the number of sections is readily available. According to ITU recommendation G.996.1 "Test Procedures for Digital Subscriber Line (DSL) Transceivers," incorporated herein in its entirety, all of the North American test loops contain less than 3 bridged taps and the maximum number of working sections is limited to 4. Considering that the tests loops referenced in this document represent the worst case, the number of bridged taps in the model should be at most 3. If the computation time, which is proportional to the number of sections in the loop is a concern, one may use a 2 bridged tap model that covers most of the practical cases of interest. If the loop contains less than 3 bridged taps and if we decide to use a 3 bridged tap model, the DE algorithm is expected to converge to a solution with one or more of the bridged tap lengths being small, with small being quantified in terms of a threshold which specifies the minimum bridged tap length. Our practical experience tells us that the bridged tap detection threshold should be set to 250 ft. In other words if the loop does not contain any bridged taps, the algorithm may converge to a solution with bridged tap lengths smaller than 250 ft which should be interpreted as no bridged taps at all.

Similarly, one can put an upper bound on the number of working sections. Note that for a 3 bridged tap loop model, the minimum number of working sections must be 4.

The transfer function measurement module 110 then measures the actual transfer function of the loop 160. In particular, the transfer function measurement module 110 can measure the transfer function of the loop during, for example, modem initialization. As discussed above, the voltage transfer function is estimated by averaging K consecutive frames of a periodic signal transmitted from the source, such as the central office 140.

Giving the model of the transfer function determined by the model determination module 100 and the measured transfer function determined by the transfer function measurement module 110, the minimization module 120 determines the model parameters which minimize a specific error criteria. In particular, the minimization model 120 performs a differential evolution to minimize the cost function. Specifically, the minimization as discussed above, is performed in three steps: an initialization, a mutation, and selection step. Specifically, during initialization, the minimization module 120 selects initial vectors of K according to a pertinent method, such as, a random generation of the parameters from a defined interval, or the like. In the mutation step, during one iteration, each vector of K competes against a trail vector which is generated according to the mutation equation $x_{trial}$ as discussed above. Finally, the selection step is performed by choosing a target vector, choosing two population members, determining the weighted difference vector, adding the weighted difference vector to a randomly chosen third vector, and if the cost value is lower, the trial vector survives into the next generation.

Based on this minimization, the estimation module 130 outputs an estimate of the transmission line characteristics based on the actual transfer function of the loop and the model transfer function of the loop.

FIG. 4 outlines an exemplary method for characterizing a loop. In particular, control begins in step S100 and continues to step S110. In step S110, an equation representing the current and voltage of the source is determined in relation to the current and voltage of the load. Next, in step S120, voltage transfer function of the loop is obtained. Then, in step S130, the actual transfer function of the loop is measured. Control then continues to step S140.

In step S140, the model parameters are used in conjunction with a differential evolution algorithm to solve the minimization. In particular, in step S150, the initial vectors of K are chosen according to, for example, a random generation of the parameters from a defined interval. Next, in step S160, during one iteration each vector of K is challenged against a trail vector which is determined according to the mutation equation. Then, in step S170, selection of the minimum is performed.

In particular, in step S180, a target vector is chosen. Next, in step S190, two population members are chosen. Then, in step S200, the weighted difference of vector is established. Control then continues to step S210. In step S210, the weighted difference of the two population vectors are added to a random third parameter vector. Next, in step S220, the is target parameter vector is compared to the new trial vector, and if the new trial vector is smaller, survives, in step S220, into the next generation and stored in a destination population. Control then continues to step S230.

In step S230, an estimation of the loop characterization is output. Control then continues to step S240 where the control sequence ends.

As illustrated in the figures, the loop length and bridged tap length estimation system can be implemented either on a single program general purpose computer, or a separate programmed general purpose computer. However, the loop length and bridged tap length estimation system can also be implemented on a special purpose computer, a programmed microprocessor or microcontroller and peripheral integrated circuit element, an ASIC or other integrated circuit, a digital signal processor, a hard wired electronic or logic circuit such as a discrete element circuit, a programmable logic device such as a PLD, PLA, FPGA, PAL, a modem, or the like. In general, any device capable of implementing a finite state machine that is in turn capable of implementing the flowcharts illustrated herein can be used to implement the loop length and bridged tap length estimation system according to this invention.

Furthermore, the disclosed method may be readily implemented in software using object or object-oriented software development environments that provide portable source code that can be used on a variety of computer or workstation hardware platforms. Alternatively, the disclosed loop length and bridged tap length estimation system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The loop length and bridged tap length estimation systems and methods illustrated herein, however, can be readily implemented in hardware and/or software using any known or later-developed systems or structures, devices and/or software by those of ordinary skill in the applicable art from the functional description provided herein and a general basic knowledge of the computer arts.

Moreover, the disclosed methods may be readily implemented as software executed on a programmed general purpose computer, a special purpose computer, a microprocessor, or the like. In these instances, the methods and systems of this invention can be implemented as a program embedded on a personal computer such as a Java® or CGI script, as a resource residing on a server or graphics workstation, as a routine embedded in a dedicated loop length and bridged tap length estimation system, a modem, a dedicated loop length and/or bridged tap length estimation system, or the like. The loop length and bridged tap length estimation system can also be implemented by physically incorporating the system and method into a software and/or hardware system, such as the hardware and software systems of a dedicated loop length and bridged tap length estimation system or modem.

It is, therefore, apparent that there has been provided, in accordance with the present invention, systems and methods for loop length and bridged tap length estimation.

While this invention has been described in conjunction with a number of embodiments thereof, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A loop length and bridged tap length estimation system comprising:
   a central office (CO) modem:
   a customer-premises equipment (CPE) modem;
   a transfer function measurement module that measures a transfer function response for a transmission line based on signals transmitted during an initialization of the CO modem and the CPE modem;
   a modeling device that determines a model of a transfer function for the transmission line; and
   a minimization module that estimates a loop length and at least one bridged tap length based on a differential evolution comparison of the model of the transfer function and the measured transfer function.

2. The system of claim 1, wherein the model of the transfer function is based on an equation representing a current and a voltage at a source in terms of a second current and a second voltage at a load.

3. The system of claim 1, wherein the measured transfer function of a loop is acquired during the initialization.

4. The system of claim 1, wherein the comparison is based on an initialization, a mutation and a selection step.

5. The system of claim 1, wherein the loop length and bridged tap length estimation is for a multicarrier modulation transmission line.

6. A method for loop length and bridged tap length estimation comprising:
   initializing a central office (CO) modem and a customer-premises equipment (CPE) modem;
   measuring a transfer function response for a transmission line based on signals transmitted during the initialization;
   determining a model of a transfer function for the transmission line; and
   estimating a loop length and at least one bridged tap length based on a differential evolution comparison of the model of the transfer function and the measured transfer function.

7. The method of claim 6, wherein the model of the transfer function is based on an equation representing a current and a voltage at a source in terms of a second current and a second voltage at a load.

8. The method of claim 6, wherein the measured transfer function of a loop is acquired during initialization.

9. The method of claim 6, wherein the comparison is based on an initialization, a mutation and a selection step.

10. The method of claim 6, wherein the loop length and bridged tap length estimation is for a multicarrier modulation transmission line.

11. A system for loop length and bridged tap length estimation comprising:
   means for initializing a central office (CO) and a customer-premises equipment (CPE) modem;
   means for measuring a transfer function response for a transmission line based on signals transmitted during the initialization;
   means for determining a model of a transfer function for the transmission line; and
   means for estimating a loop length and at least one bridged tap length based on a differential evolution comparison of the model of the transfer function and the measured transfer function.

12. The system of claim 11, wherein the model of the transfer function is based on an equation representing a current and a voltage at a source in terms of a second current and a second voltage at a load.

13. The system of claim 11, wherein the measured transfer function of a loop is acquired during initialization.

14. The system of claim 11, wherein the comparison is based on an initialization, a mutation and a selection step.

15. The system of claim 1 wherein the loop length and bridged tap length estimation is for a multicarrier modulation transmission line.

16. An information storage media comprising information that estimates a loop length and a bridged tap length comprising:

information that initializes a central office (CO) and a customer-premises equipment (CPE) modem;

information that measures a transfer function response for a transmission line based on signals transmitted during the initialization;

information that determines a model of a transfer function for the transmission line; and information that estimates a loop length and at least one bridged tap length based on a differential evolution comparison of the model of the transfer function and the measured transfer function.

17. The media of claim 16, wherein the model of the transfer function is based on an equation representing a current and a voltage at a source in terms of a second current and a second voltage at a load.

18. The media of claim 16, wherein the measured transfer function of a loop is acquired during initialization.

19. The media of claim 16, wherein the comparison is based on an initialization, a mutation and a selection step.

20. The media of claim 16, wherein the loop length and bridged tap length estimation is for a multicarrier modulation transmission line.

* * * * *